United States Patent
Danican et al.

(10) Patent No.: US 7,063,738 B2
(45) Date of Patent: Jun. 20, 2006

(54) PERMEABLE CEMENTS

(75) Inventors: Samuel Danican, Clamart (FR); Bruno Drochon, Noisy le Grand (FR); Simon James, Le Plessis-Robinson (FR); Beilin Ding, Nozay (FR)

(73) Assignee: Schlumberger Technology Corporation, Sugarland, TX (US)

( * ) Notice: Subject to any disclaimer, the term of this patent is extended or adjusted under 35 U.S.C. 154(b) by 81 days.

(21) Appl. No.: 10/258,979

(22) PCT Filed: May 11, 2001

(86) PCT No.: PCT/EP01/05511

§ 371 (c)(1),
(2), (4) Date: Oct. 30, 2002

(87) PCT Pub. No.: WO01/87797

PCT Pub. Date: Nov. 22, 2001

(65) Prior Publication Data

US 2003/0116064 A1  Jun. 26, 2003

(30) Foreign Application Priority Data

May 15, 2000  (FR) ................................. 00 06171
May 4, 2001  (EP) ................................. 01401167

(51) Int. Cl.
*C04B 16/08* (2006.01)
(52) U.S. Cl. .................. 106/672; 106/679; 106/682; 106/696; 106/724; 106/822

(58) Field of Classification Search ................ 106/724, 106/696, 822, 672, 679, 682, DIG. 1
See application file for complete search history.

(56) References Cited

U.S. PATENT DOCUMENTS

| | | | | |
|---|---|---|---|---|
| 4,234,344 A * | 11/1980 | Tinsley et al. | ............. | 106/672 |
| 4,362,566 A * | 12/1982 | Hinterwaldner | ............. | 521/180 |
| 4,501,830 A * | 2/1985 | Miller et al. | ............. | 523/401 |
| 4,721,160 A * | 1/1988 | Parcevaux et al. | .......... | 166/293 |
| 4,933,031 A * | 6/1990 | Blomberg et al. | .......... | 106/679 |
| 5,238,064 A * | 8/1993 | Dahl et al. | ................ | 166/293 |
| 6,060,535 A * | 5/2000 | Villar et al. | ............... | 166/293 |
| 6,152,227 A * | 11/2000 | Lawson et al. | ............ | 166/293 |
| 6,626,991 B1 * | 9/2003 | Drochon et al. | ........... | 106/672 |
| 6,644,405 B1 * | 11/2003 | Vijn et al. | ................ | 166/293 |
| 6,656,265 B1 * | 12/2003 | Garnier et al. | ............. | 106/713 |
| 6,660,078 B1 * | 12/2003 | Brothers et al. | ........... | 106/705 |
| 6,739,806 B1 * | 5/2004 | Szymanski et al. | ........ | 405/267 |
| 2004/0107875 A1 * | 6/2004 | Drochon et al. | ........... | 106/714 |
| 2004/0112255 A1 * | 6/2004 | Bruno et al. | ............... | 106/672 |

\* cited by examiner

*Primary Examiner*—Paul Marcantoni
(74) *Attorney, Agent, or Firm*—Thomas O. Mitchell; Tim Curington; Robin Nava

(57) ABSTRACT

A permeable cement composition comprises an aqueous slurry of a hydraulic cement including a water-immiscible dispersed fluid phase, such as oil or gas, and a hollow particulate material, the hollow particulate material being one which breaks down in the presence of the cement so as to leave voids which together with the dispersed phase create a permeable structure in the cement.

19 Claims, No Drawings

PERMEABLE CEMENTS

The present invention relates to permeable cement compositions, in particular permeable cement compositions for use in oil or gas wells, or the like.

In many oil well applications, cement is used both to secure a casing within the well and to provide zonal isolation between the different fluid-producing layers in the formation through which the well passes. In such cases, it is desirable for the cement to have very low permeability (permeability is the property of a material to allow a fluid to pass therethrough, typically measured in darcies "d" or millidarcies "md" and relative to a given fluid, e.g. oil or water). Fluid communication between the formation and the well is obtained by use of perforating charges placed next to the producing zones of interest. However, there are certain applications in which permeable cements are considered useful. Typically, these are regions in which it is only required to provide mechanical support to the formation or casing/liner near the well while still allowing flow from the formation into the well. One such example is where the producing zone comprises a poorly consolidated formation which requires stabilization.

There have been various proposals to provide permeable cements for well applications. One such proposal describes the use of a mixture of sand, cement and water suspended in a hydrocarbon for injection into the zone to be treated, see for example U.S. Pat. No. 3,429,373; U.S. Pat. No. 3,646,998; U.S. Pat. No. 3,654,990; U.S. Pat. No. 3,654,991; U.S. Pat. No. 3,654,992; U.S. Pat. No. 3,768,561; U.S. Pat. No. 3,861,467; U.S. Pat. No. 3,862,663; and U.S. Pat. No. 3,948,672. Another proposal is the use of a cement incorporating a material that can be removed to leave porosity and permeability, such as by dissolution with acid or decomposition by heat, see for example RU 2019689 and U.S. Pat. No. 6,202,751. A yet further prior proposal is to use foamed cements, often with extreme foam qualities (foam quality is the ratio of the dispersed phase (gas) volume to total volume of foamed composition under given pressure and temperature conditions). Examples of such a proposal can be found in U.S. Pat. No. 5,339,902.

Each of the prior proposals has one or more disadvantages. These include difficulty in producing a pumpable slurry, low compressive strength of the set cement, the requirement for post-placement treatments or difficulty in providing or maintaining foams at high downhole pressures or at high foam qualities.

It is an object of the present invention to provide permeable cement compositions that obviate or mitigate some or all of these problems.

One aspect of the invention comprises a permeable cement composition, comprising an aqueous slurry of a hydraulic cement including a water-immiscible dispersed fluid phase and a hollow particulate material, the hollow particulate material being one which breaks down in the presence of the cement so as to leave voids which together with the dispersed phase create a permeable structure in the cement.

The use of a hollow particulate material, such as microspheres or cenospheres, allows development of a permeable structure while avoiding the use of very high quantities of the dispersed phase, such as high foam qualities, which can make the slurry difficult to form or place. Such materials, typically formed from aluminosilicate or other glass like materials, break down due to the chemical and thermal environment in the setting cement. In breaking down these materials "release" their porosity and assist in interconnecting the dispersed fluid phase. The exact nature and amount of hollow material used depends upon requirements. A typical material can comprise hollow spheres having average sizes in the range 350–50 microns and can be present in amounts of between 10% and 60% by volume of the dry materials used to form the slurry. A suitable source of such hollow materials is the SL range of E-Spheres products from Envirospheres Pty Ltd of Australia. These are available in various size grades, for example 56 micron, 100–180 micron, 290 micron and 320 micron.

The water-immiscible dispersed fluid phase can comprise gas such as air or nitrogen, or liquids such as oil. In one embodiment of the invention, the dispersed phase is a gas and the cement slurry is formed as a foam. In another embodiment, the dispersed phase is an oil present as an emulsion in the aqueous slurry.

The hydraulic cement is preferably Portland cement which may or may not include pozzolanic material such as blast furnace slag or fly ash or natural materials such as pozzolana or calcined clays. It is also possible to use high-alumina cements also known as Ciment Fondu, plaster, Sorel cement, activated pozzolanic cements or any other hydraulic cement.

Preferably the solid particles used to make the slurry comprise coarse particles having a particle size in the range 100–800 microns, medium particles having particle sizes in the range 20–60 microns, and fine particles having particle sizes in the range 0.1–10 micron. Among these numerous possibilities, a combination comprising four types of particle, namely a Portland cement, fine particles with a mean size of about 3 microns, hollow cenospheres, and very coarse particles (more than 200 microns) is one preferred case. However, systems using only coarse and fine particle sizes or medium and fine particle sizes or coarse and medium particles are also possible. The fine particles can be constituted by a micro-cement in some cases and a large particle size cement can comprise some or part of the coarse particles if required. The hollow particles are typically in the coarse particle range but can also fall in the medium particle size range.

Depending on requirements, different known additives can be added to the slurry such as dispersing agents, retarding agents or accelerators, or fluid loss control agents. In the case of a Portland cement, when the temperature is over 105° C., silica is added in a proportion of 30% to 50% by weight relative to the cement, as is known in the art to prevent retrogression of compressive strength.

The coarse particles (e.g. hollow spheres, haematite, large particle size cement, etc.) can be present in an amount of up to 80% by volume, preferably 30%–80% by volume, more preferably 30%–60% by volume, of the solid materials used to make the slurry. The medium particles (e.g. Portland class G cement, hollow spheres, etc.) can be present in an amount of up to 90% by volume, preferably 10%–90% by volume, more preferably 30%–60% by volume, of the solid materials used to make the slurry. The fine particles (e.g. Portland micro-cement, slag, etc.) are preferably present in an amount of 0%–40% by volume, more preferably about 10% by volume, of the solid materials used to make the slurry.

The liquid fraction of the slurry is typically in the range 38%–50% by volume of the slurry when the dispersed phase is a gas. When the dispersed phase is oil, the water fraction can comprise 38%–50% by volume of the water and solids combined and the oil 40%–60% by volume of the total.

In the case of an oil emulsion, the use of degradable surfactants can be used to mitigate some of the detrimental effects on the cement setting mechanism. Suitable degradable surfactants are, for example, ethoxylated castor oil surfactants of various ethoxy chain lengths such as those sold by Akzo Nobel under the Berol trade name, e.g. Berol 108, B27, 829 and 192 (in order of decreasing chain length).

Also falling within the scope of the invention are the following remedial applications of the cement compositions described above:

Stopping sand production from a well. When the reservoir is constituted by unconsolidated or poorly consolidated sand, or by poorly bound sandstone or where the formation matrix can be easily dissolved by water, fluid flow into the well entrains grains of sand. The production of sand can lead to a stoppage in well production. To avoid such a situation, a gravel pack or filter screens are normally installed inside the well to stop the sand. Over time, these can become soiled or blocked with fine particles and replacing them is difficult and expensive. Placing a permeable cement according to the invention behind the casing and producing the formation fluids through this layer can prevent sand production into the well and prevent it from becoming necessary to perform the standard operations.

The permeable cement compositions of the invention have the advantage over conventional solutions in that a permeable pack can be made without requiring fluid leakoff to concentrate a solid slurry.

When gravel-packing (or frac-packing) long intervals and/or heterogeneous permeability formations excessive leakoff may occur in certain areas leading to premature screen out and incomplete packing of the annulus. This has previously been overcome by mechanical means (shunt tubes). Permeable cement according to the invention will provide a chemical means to do the same job by being able to form a permeable-pack without requiring leakoff and hence avoiding the potential for screen-out and the need for mechanical placement technologies that anticipate this and provide alternative flow paths.

In some sand-producing formations, where some form of sand control was not used initially, hydrocarbon production has led to caverns/voids being formed behind casing. The size of the caverns is unknown (no tools are available to measure the size). In such a situation, to stop further formation sand production and/or to support the casing, a conventional method would be to pump curable resin-coated proppant slurry into the cavern. Ideally with leak off this would concentrate the slurry forming a permeable consolidated pack in the cavern. However, as the size of the cavern is unknown it is impossible to design a treatment that would guarantee that the entire cavern would be filled. For example if the leakoff rate is higher than expected then the slurry could dehydrate too quickly causing an early screen out perhaps leaving the cavern only half filled. However, with permeable cement according to this invention, it is possible to continue pumping to fill the entire cavern. If the cement displaced reservoir fluid back into the formation quickly in one area as soon as the cement reached the rock face it would not go any further. The slurry behind is still pumpable (not dehydrated) so that continued pumping would force the cement to fill the entire cavern.

Simple replacement of the cement behind the casing. This can be carried out with a conventional cement, but then the casing and the new layer of cement needs to be perforated again to re-connect the well to the reservoir, with the risk of the connection not being made if the cement layer is thicker than planned or perforation is not deep enough. Injecting a permeable cement according to the invention avoids the need for perforation and typically costs less and guarantees that connection will be established in all cases.

Applications of the permeable cement compositions in primary cementing operations are also possible, as follows:

When the strength of the formation is sufficient to allow it, or when the well is highly deviated the cost and/or difficulty related to effectively placing a casing are avoided by carrying out what is known as an uncased or barefoot completion. Sand packing or gravel packing can then be installed if the reservoir might produce sand. A pre-perforated blank liner can also be employed. Placing a layer of permeable cement at the surface of the well walls can avoid the need for such operations. Furthermore, when the formation of the reservoir is not sufficiently strong for that type of simplified completion and it would otherwise have been necessary to put a casing into position with cementing between the casing and the well wall, putting the permeable cement of the invention into position can reinforce the sides of the well and can avoid the need for a casing and subsequent perforation thereof.

When completion with a casing is unavoidable because the rock of the reservoir is very poorly consolidated, placing the permeable cement of the invention between the casing and the sides of the well, instead of a conventional cement, can avoid the need for installing gravel packing or sand packing which is very expensive.

The invention will now be described by way of the following non-limiting examples:

EXAMPLE 1

Slurry A (reference): This slurry corresponds to the prior art. It comprises a class G cement and water such that the density of the slurry is 1900 kg/m$^3$ (15.8 pounds per gallon, ppg). The slurry is foamed after adding surfactants (aqueous mixture of polyglycols, oxyalkylates and methanol; and a mixture of ethanol, 2 butoxyethanol and ammonium alcohol ethoxysulfate—chain length 6–10) in an amount of 0.084 gallons per sack (0.007 l/kg) of powder, to obtain a foam quality of 40% (i.e. the volume of the foam represented 40% of the final volume of the foamed slurry).

The compressive strength and water permeability are measured using samples which are left at ambient temperature and at atmospheric pressure for 48 hours (h) then in an oven at 85° C. for 5 days. The compressive strength is expressed in MPa, with pounds per square inch (psi) in brackets.

The properties of a slurry prepared in accordance with the invention is presented and compared:

Slurry B: A mixture of powders is prepared comprising 30% by volume of haematite particles with a mean size of about 300 microns; 30% by volume of hollow cenospheres with a mean size of 180 microns; 30% by volume of class G Portland cement and 10% by volume of a Portland/slag micro-cement with a mean size of about 3 microns. Water and a polynaphthalene sulfonate-based super-plasticizer in an amount of 0.07 gallons per sack (0.006 l/kg) of powder are mixed with this powder such that the volume percentage of liquid in the slurry is 40%. It should be noted that a sack of powder is defined by analogy with a sack of cement, one sack being 45.359 kg of mixture. In other words, 1 gps=0.0834 l of additive per kg of mixture.

The slurry is foamed using the same procedure, after adding surfactants as in Slurry A, to obtain a foam quality of 40% (i.e. the volume of the foam represented 40% of the final volume of the foamed slurry).

The compressive strength and water permeability are measured using samples which are left at ambient temperature and at atmospheric pressure for 48 h then in an oven at 85° C. for 5 days.

| Slurry | A (reference) | B |
|---|---|---|
| Porosity before foaming | 59% | 40% |
| Compressive strength, MPa (psi) | 5.93 (860) | 5.59 (810) |
| Water permeability (Darcy) | 0.008 | 1.2 |

This example demonstrates that a composition within the scope of the invention can provide comparable compressive strength to prior art slurries while demonstrating dramatically increased permeability, despite the lower initial porosity of the slurry.

EXAMPLE 2

The properties of five slurries prepared in accordance with the invention but foamed with different foam qualities are presented and compared:

Basic slurry: A mixture of powders is prepared comprising 30% by volume of haematite particles with a mean size of about 300 microns; 30% by volume of hollow spheres with a mean size of 180 microns; 30% by volume of class G Portland cement and 10% by volume of a Portland/slag micro-cement with a mean size of about 3 microns. Water and a polynaphthalene sulfonate-based super-plasticizer in an amount of 0.07 gallons per sack of powder (0.006 l/kg) are mixed with this powder such that the volume percentage of liquid in the slurry is 40%. Surfactants are added to the basic slurry and the slurries foamed to obtain a foam qualities of 30% to 50% (a foam quality of 30% means that the foam volume represents 30% of the final volume of the slurry).

| Slurry | C1 | C2 | C3 | C4 | C5 |
|---|---|---|---|---|---|
| Porosity before foaming | 40% | 40% | 40% | 40% | 40% |
| Foam quality | 30% | 35% | 40% | 45% | 50% |
| Compressive strength, MPa (psi) | 8.27 (1200) | 6.90 (1000) | 5.59 (810) | 4.48 (650) | 2.83 (410) |
| Water permeability (Darcy) | 0.0045 | 0.160 | 1.2 | 6.1 | >12 |

The compressive strength and water permeability are measured using samples which are left at ambient temperature and at atmospheric pressure for 48 h then in an oven at 85° C. for 5 days.

EXAMPLE 3

The properties of two slurries prepared in accordance with the invention, both containing self-destructive particles but with coarse particles of differing size and nature, are presented and compared:

Slurry D: A mixture of powders is prepared comprising 30% by volume of haematite particles with a mean size of about 300 microns; 30% by volume of hollow cenospheres) with a mean size of 180 microns; 30% by volume of class G Portland cement and 10% by volume of a Portland/slag micro-cement with a mean size of about 3 microns. Water and a polynaphthalene sulfonate-based super-plasticizer in an amount of 0.07 gallons per sack of powder (0.006 l/kg) are mixed with this powder such that the volume percentage of liquid in the slurry is 40%.

Slurry E: A mixture of powders is prepared comprising 30% by volume of calcium carbonate particles with a mean size of about 500 microns; 30% by volume of hollow cenospheres with a mean size of 180 microns; 30% by volume of class G Portland cement and 10% by volume of a Portland/slag micro-cement with a mean size of about 3 microns. Water and a polynaphthalene sulfonate-based super-plasticizer in an amount of 0.07 gallons per sack of powder (0.006 l/kg) are mixed with this powder such that the volume percentage of liquid in the slurry is 40%.

These two slurries are foamed using the same procedure, after adding surfactants as in slurry A, to obtain a foam quality of 35% (i.e., the volume of the foam represented 35% of the final volume of the foamed slurry).

| Slurry | D | E |
|---|---|---|
| Porosity before foaming | 40% | 40% |
| Compressive strength | 6.90 (1000) | 5.79 (840) |
| Water permeability (D) | 0.160 | 0.270 |

The compressive strength and water permeability are measured using samples which are left at ambient temperature and at atmospheric pressure for 48 h then in an oven at 85° C. for 5 days.

EXAMPLE 4

A formulation demonstrating good properties with 60% particles of average size between 20 and 50 microns and 30% of large particles.

A powder blend is mixed containing 10% by volume mix portland micro-cement/slag, average size 3 microns, 60% class G cement and 30% hollow spheres of average size 320 microns. Water and polynaphthalene sulphonate dispersant (0.07 gallons per sack of powder blend, 0.006 l/kg) are added so that the volume of liquid in the slurry is 45% and the slurry is foamed as above to obtain a foam quality of 40%.

The slurry is heated in a sealed container for two days at 85° C. The resultant cement has a permeability of 1.2 darcy and a compressive strength of 910 psi.

EXAMPLE 5

A formulation demonstrating that high permeability can be obtained with two particle sizes only and with 40% fine particles.

A powder blend is mixed containing 40% by volume Portland micro-cement/slag, average size 3 microns, 30% hollow spheres of average size 180 microns and 30% hematite of average size 300 microns. Water and polynaphthalene sulphonate dispersant (0.07 gallons per sack of powder blend, 0.006 l/kg) are added so that the volume of liquid in the slurry is 45% and the slurry is foamed as above to obtain a foam quality of 55%.

The slurry is left in a sealed container for two days at ambient temperature and then 5 days in an oven at 85° C. The resultant cement has a permeability of 13 darcy and a compressive strength of 300 psi.

EXAMPLE 6

A formulation including large particle size cement as some of the large particles giving increased compressive strength whilst retaining significant permeability.

The formulation is identical to C3 above in Example 3 (40% foam, 30% hematite, 30% hollow spheres, 30% cement and 10% micro cement) except that hematite is replaced by large particle cement. Formulation C3 has a permeability of 1.2 darcy and compressive strength of 810 psi. This formulation with hematite replaced by large particle size cement has permeability of 0.62 Darcy but compressive strength increases to 1240 psi.

EXAMPLE 7

Permeable cement can be made without large particles.

A powder blend is mixed containing 10% by volume mix Portland micro-cement/slag, average size 3 microns, 35% class G cement and 55% hollow spheres of average size 55 microns. Water and polynaphthalene sulphonate dispersant (0.07 gallons per sack of powder blend, 0.006 l/kg) are added so that the volume of liquid in the slurry is 45% and the slurry is foamed as above to obtain a foam quality of 40%.

The slurry is left in a sealed container for two days at ambient temperature and then 5 days in an oven at 85° C. The resultant cement has a permeability of 0.15 darcy and a compressive strength of 1310 psi.

Emulsion Formulations

One approach for emulsion formulations within the scope of the invention is to make the slurry blend (particles, dispersant and water) and then mix in surfactant and oil to give an emulsion (oil in cement phase or cement phase in oil depending on the surfactant).

EXAMPLE 8

A powder base made up with 30% cement (medium particles), 10% micro cement (fine particles), 30% hollow spheres and 30% hematite (large particles). Water is added to be 40% by volume of the slurry and the same dispersant is used as in the foam formulations described above. Surfactant is added at 0.04 gallons per sack of powders (0.003 l/kg) and oil is added so as to be 40% of the volume of the total emulsion system. The oil used is a linear alphaolefin. The slurries are placed in an oven for 2 days at 85° C.

Two surfactants are used—a sulfated ethoxylated nonyl phenol (slurry F) and an ethylene-oxide propylene oxide surfactant with a cloud point at around 60° C. (slurry G).

Slurry F shows a compressive strength of 345 psi and permeability to water <0.1 md. Slurry G shows a compressive strength of 649 psi and permeability to water of 2.5 md and a permeability to oil of 20 md.

EXAMPLE 9

A powder base is prepared with 30% cement, 10% micro cement, 50% hollow spheres and 10% large particle size cement. Water is added so as to be 40% by volume of the slurry and a dispersant used as in the foam examples above. Oil is added at 40%, 50% or 60% of volume of total and the surfactant is used at 0.9% by volume of oil added. The slurries are placed in an oven for 2 days at 85° C.
40% oil slurry: permeability to water of 4 md, compressive strength=481 psi
50% oil slurry: permeability to water of 78 md and a permeability to oil of 249 md, compressive strength to water of 349 psi
60% oil slurry: permeability to water of 61 md, compressive strength=138 psi Increasing the amount of oil allows greater connectivity with other oil droplets and with hollow spheres so as to create a potentially permeable structure. High levels of oil and surfactant can inhibit setting of the cement and hence inhibit the destruction of the hollow spheres which in turn impacts the permeability of the final cement.

EXAMPLE 10

By using a degradable surfactant the impact on development of a permeable structure as described above can be mitigated.

A powder base is made up with 30% cement, 10% micro cement, 50% hollow spheres and 10% large particle size cement and water is added so as to be 40% by volume of the slurry and dispersant used as in the foam examples above. Three ethoxylated castor oil surfactants are used with decreasing ethoxy-chain lengths—surfactant A>surfactant B>surfactant C. The surfactants are used at 0.06 gallons per sack of powders (0.005 l/kg). Oil is added so as to be 40% of the volume of the total emulsion system. The oil used is a linear alphaolefin. The fluids are placed in an oven for 2 days at 85° C.
Surfactant A system: permeability to water of 0.1 md, compressive strength 618 psi
Surfactant B system: permeability to water of 4.5 md, compressive strength 449 psi
Surfactant C system: permeability to water of 75 md, compressive strength 1208 psi

EXAMPLE 11

A powder base is made up with 10% micro cement, 30% class G cement, 30% hematite, 30% hollow spheres. The powder is mixed with water and dispersant (total 40% of slurry volume) and the resulting slurry placed under 3000 psi pressure for 10 minutes to simulate the effect of well pressures on the hollow spheres (some may break). The slurry is then foamed to 40% quality and put in a sealed cell for 2 days at 85° C. After setting the initial permeability to water is 8.9 Darcy decreasing with time and rate to 3 Darcy. The permeability to oil of the same sample is 13 Darcy increasing to 19 Darcy with time and rate. The difference in permeability to oil and water will allow preferential production of oil from a formation producing both oil and water.

The invention claimed is:
1. A permeable set cement obtained by
   a) preparing a slurry including
      i) an aqueous continuous phase;
      ii) a water-immiscible dispersed nitrogen or oil fluid phase, in an amount of from 40%–50% of the total volume of the slurry;
      iii) a blend of solid particles including hydraulic cement particles and hollow particulate material, in an amount of 10%–60% by volume of solid blend
   b) and allowing the cement to set at a temperature such that the hollow particulate material breaks down due to the chemical and thermal environment in the cement, so as to leave voids which together with the dispersed phase result in a set cement having a permeability of at least 1 Darcy.

2. The cement of claim 1, wherein the hydraulic cement is Class G Portland cement and the hollow particulate material comprises cenospheres.

3. The cement of claim 2, wherein the cement is allowed to set at a temperature of at least 85° C.

4. The cement of claim 1, wherein the hollow particulate material has particle sizes in the range 350–50 microns.

5. The cement of claim 1, wherein the solid blend includes a combination of at least two of a fine particulate material having particle sizes in the range 0.1–10 micron, a medium particulate material having particle sizes in the range 20–60 micron, and a coarse particulate material having particle sizes in the range 100–800 micron.

6. The cement of claim 5, wherein the fine particulate material comprises micro-cement.

7. The cement of claim 5, wherein the coarse particulate material comprises large particle size cement.

8. The cement of claim 5, wherein the hollow particulate material comprises the medium or coarse particulate material.

9. The cement of claim 5, wherein the coarse particulate material is present in an amount of 30%–80% by volume of the solid blend.

10. The cement of claim 9, wherein the coarse particulate material is present in an amount of 30%–60% by volume of the solid material used to make the slurry.

11. The cement of claim 5, wherein the medium particulate material is present in an amount of 10%–90% by volume of the solid material used to make the slurry.

12. The cement of claim 11, wherein the medium particulate material is present in an amount of 30%–60% by volume of the solid material used to make the slurry.

13. The cement of claim 5 wherein the fine particulate material is present in an amount of up to 40% by volume of the solid material used to make the slurry.

14. The cement of claim 5, wherein the fine particulate material is present in an amount of about 10% by volume of the solid material used to make the slurry.

15. The cement of claim 1, wherein the slurry comprises a liquid fraction in the range 38%–50% by volume of the slurry when the dispersed phase is a gas.

16. The cement of claim 1, wherein when the dispersed phase comprises oil, the slurry comprises 38%–50% by volume of an aqueous phase and 40%–60% by volume of the total of oil.

17. The cement of claim 1, wherein the slurry further comprises a degradable surfactant.

18. The cement of claim 17, wherein the degradable surfactant comprises an ethoxylated castor oil.

19. The cement of claim 1, wherein the slurry further comprises a surfactant with a cloud point.

\* \* \* \* \*